(12) United States Patent
Ben-Tzur

(10) Patent No.: US 9,740,787 B2
(45) Date of Patent: *Aug. 22, 2017

(54) APPLICATION SEARCH RESULTS BASED ON A CURRENT SEARCH QUERY AND A PREVIOUS SEARCH QUERY

(71) Applicant: Quixey, Inc., Mountain View, CA (US)

(72) Inventor: Jonathan Ben-Tzur, Sunnyvale, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,833

(22) Filed: Dec. 14, 2015

(65) Prior Publication Data

US 2017/0169114 A1 Jun. 15, 2017

(51) Int. Cl.
*G06F 17/30* (2006.01)

(52) U.S. Cl.
CPC .... *G06F 17/30867* (2013.01); *G06F 17/3087* (2013.01); *G06F 17/30551* (2013.01)

(58) Field of Classification Search
CPC ......... G06F 17/30551; G06F 17/30864; G06F 17/3087; G06F 17/30867
See application file for complete search history.

(56) References Cited

U.S. PATENT DOCUMENTS

| | | | |
|---|---|---|---|
| 8,898,148 B1* | 11/2014 | Yagnik | G06F 17/30867 707/721 |
| 9,489,692 B1* | 11/2016 | Yu | G06Q 30/08 |
| 2003/0036848 A1* | 2/2003 | Sheha | G01C 21/3679 701/468 |
| 2014/0321448 A1* | 10/2014 | Backholm | H04L 43/10 370/338 |

OTHER PUBLICATIONS

U.S. Appl. No. 15/245,741, filed Aug. 24, 2016, Jonathan Ben-Tzur.

* cited by examiner

*Primary Examiner* — Cam-Y Truong
(74) *Attorney, Agent, or Firm* — Harness, Dickey & Pierce, P.L.C.

(57) ABSTRACT

A search server that receives a search request from a mobile computing device, the search request comprising a first search query that comprises one or more search terms; utilizes stored search queries to determine a second search query received from the mobile computing device, the second search query being received within a threshold time period prior to the first search query; determines search results by identifying applications based on the stored information regarding the applications and the search terms in the first search query; for at least one application in the search results, determines a state of the application that corresponds with the second search query; and transmits a search result object comprising information regarding the applications determined based on the first search query and the states determined based on the second search query.

20 Claims, 5 Drawing Sheets

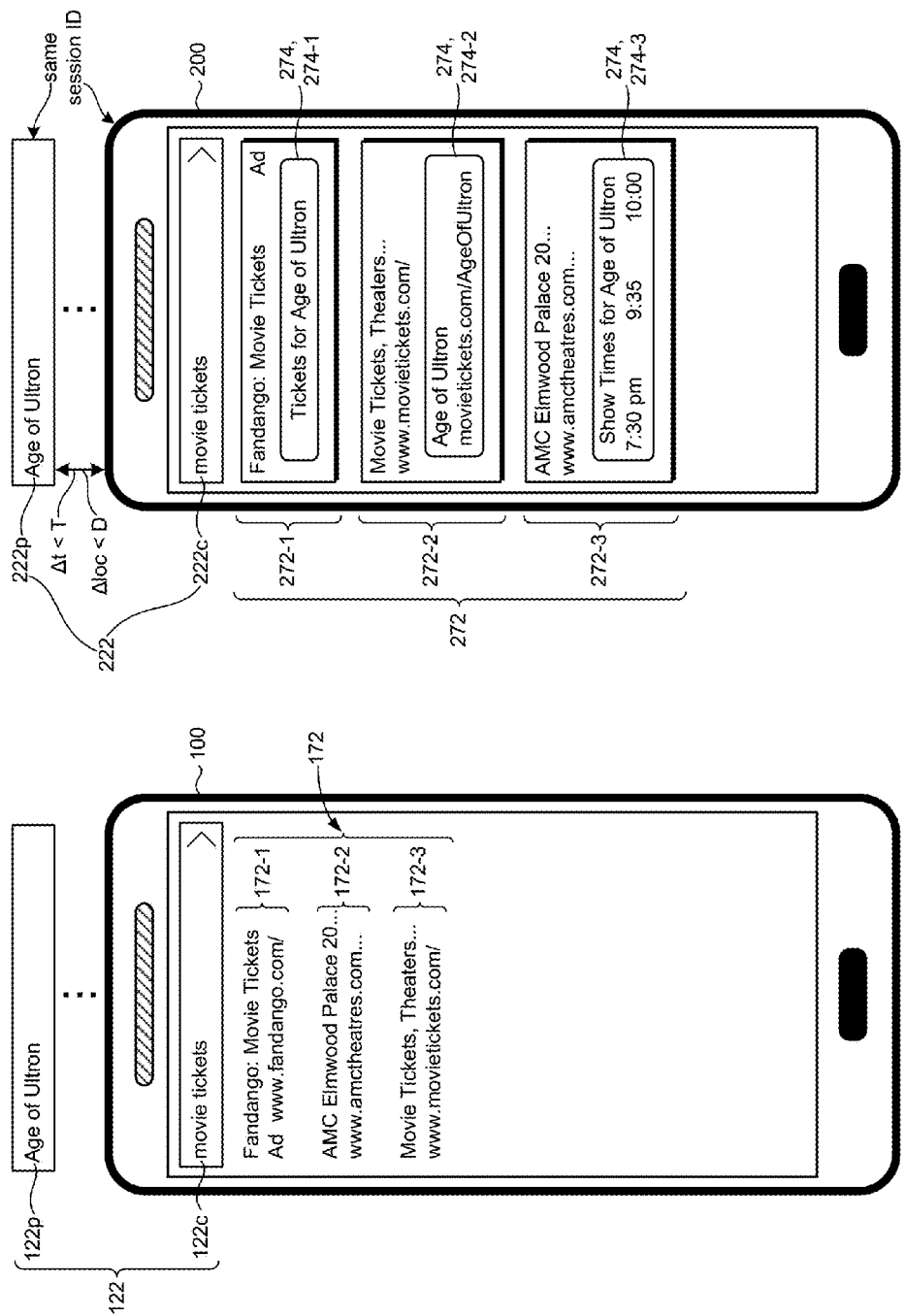

APPLICATION SEARCH RESULTS BASED ON A CURRENT SEARCH QUERY AND A PREVIOUS SEARCH QUERY

TECHNICAL FIELD

This disclosure relates to providing application search results based on a current search query, and a previous search query received from a mobile computing device.

BACKGROUND

Many mobile computing devices can transmit a search query, and receive and display search results in response to the search query. Some mobile computing devices display a graphical user interface (GUI) that includes a search box that can receive search queries from a user of the mobile computing device. The search box may be displayed by an operating system that is installed on the mobile computing device. Alternatively, the search box may be displayed by an application (e.g., a web application that can be accessed through a web browser or a native application that is installed on the mobile computing device). Alternatively, the search box may be displayed by an application launcher that launches applications. Upon receiving a search query, the mobile computing device can transmit the search query to a search engine. In response to transmitting the search query, the mobile computing device may receive search results that are based on the search query that the mobile computing device transmitted.

SUMMARY

One aspect of the disclosure provides a search server. The search server includes a network communication device, a storage device and a processing device. The storage device can store a query log, an application data store, and a state data store. The query log stores search queries that the search server receives. Each search query may be stored in association with a device identifier (ID) that identifies a mobile computing device that sent the search query, and a time at which the search server received the search query. The application data store that stores application records, each application record stores information regarding an application. The state data store stores state records, each state record stores information regarding an application state. The processing device executes computer-readable instructions that, when executed by the processing device, cause the processing device to receive a search request from a mobile computing device. The search request comprises a device ID that identifies the mobile computing device and a first search query that comprises one or more search terms.

The search server determine a first time at which the search server received the search request with the first search query. The search server determines a second search query that the search server previously received from the mobile computing device at a second time. The search server determines that a time difference between the first time and the second time is less than a threshold time period. The search server selects an application record from the application data store based on the search terms of the first search query. The search server selects a state record that corresponds with an application state of the application associated with the selected application record based on search terms of the second search query. The search server generates a search result object that comprises information from the application record selected based on the first search query, and the state record selected based on the second search query. The search server transmits the search result object to the mobile computing device.

In some implementations, the search server can determine the second search query by retrieving the device ID from the search request. The search server can query the query log with the device ID, and a time range that extends for the threshold time period prior to the first time. The search server can receive the second search query from the query log, the second search query being received at the search server within the time range.

In some implementations, each search query in the query log may be associated with a device location that indicates the location of the mobile computing device when the mobile computing device transmitted the search query. In such implementations, the search server can determine the second search query by determining a first location of the mobile computing device when the mobile computing device transmitted the first search query. The search server can query the query log with the device ID and the first location. The search server can receive the second search query from the query log, the second search query being associated with a second location that is within a threshold distance of the first location.

In some implementations, each search query in the query log may be associated with a session ID that indicates the session assigned to the mobile computing device when the mobile computing device transmitted the search query. In such implementations, the search server can determine the second search query by determining a first session ID associated with the mobile computing device when the mobile computing device transmitted the first search query. The search server can query the query log with the device ID and the first session ID. The search server can receive the second search query from the query log, the second search query being associated with a second session ID that is equal to the first session ID.

In some implementations, the search server can select the application record by querying a mapping mechanism (e.g., an inverted index, a look-up table, etc.) of the application data store with the search terms of the first search query. The mapping mechanism maps keywords to application record IDs that identify the application records. The search server may receive one or more application record IDs from the application data store in response to the querying.

In some implementations, the search server can select the state record by querying a mapping mechanism of the state data store with the search terms of the second search query. The mapping mechanism may map keywords to state record IDs that identify the state records. The search server can receive one or more state record IDs from the state data store in response to the querying. In some implementations, the search server can identify unparameterized data fields in the selected state record. In such implementations, the search server can parameterize one or more of the unparameterized data fields based on search terms in the second search query.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 is a diagram of a mobile computing device that displays search results in response to a search query.

FIG. 2 is a diagram of the mobile computing device that displays search results for a current search query based on a previous search query.

Like reference symbols in the various drawings indicate like elements.

DETAILED DESCRIPTION

Figure 3:
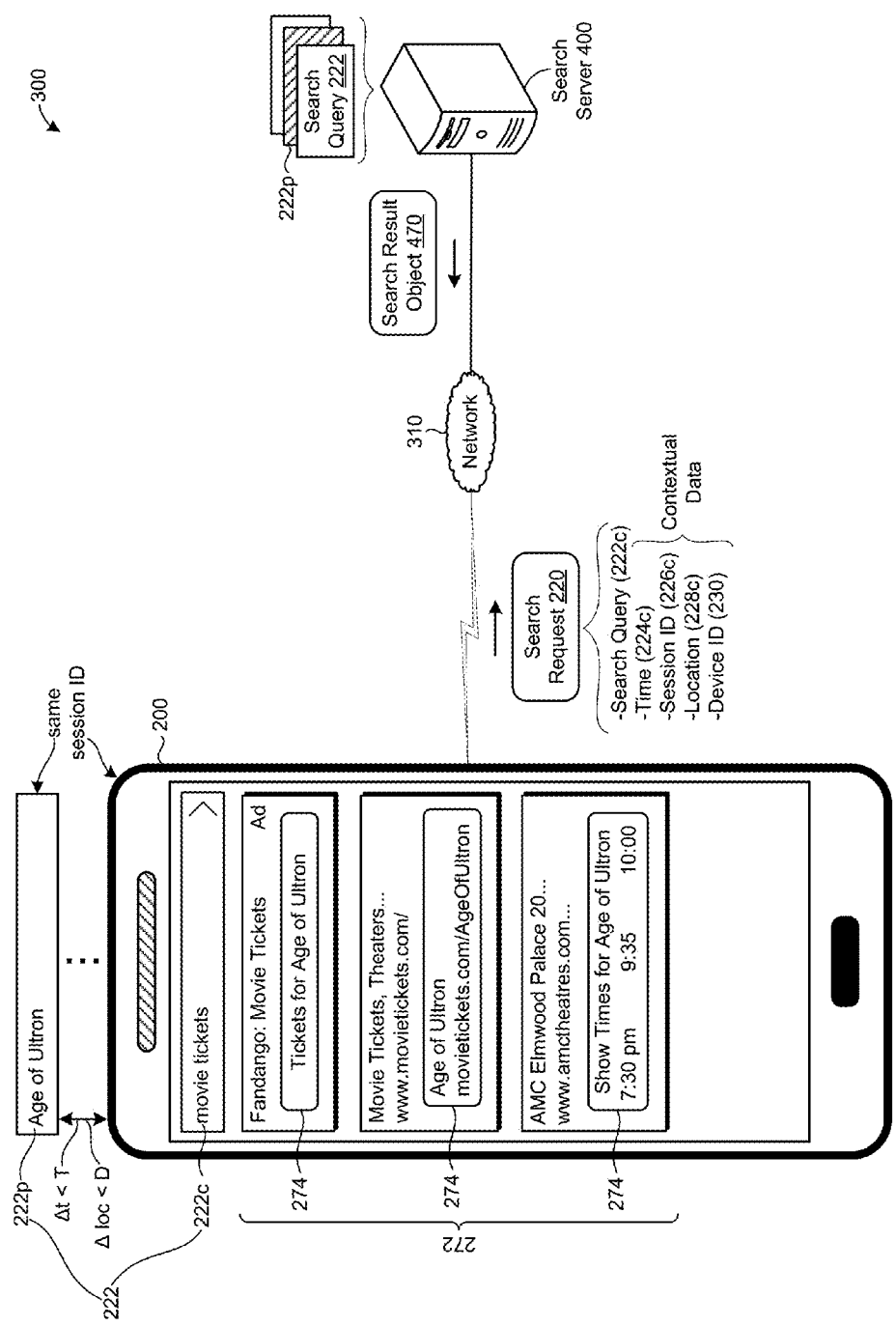
FIG. 3 is a schematic diagram of a search system that determines search results for a current search query based on previous search queries.

A search server may store numerous search records that can be used to provide search results in response to a search query. The search records may include application records that correspond with applications. An application may refer to a web application that can be accessed through a web browser or a native application that can be installed on a mobile computing device. The search server can receive search queries from mobile computing devices. Upon receiving a search query, the search server can identify one or more search records that may be relevant to the search query. For example, upon receiving a search query for "movie tickets", the search server may identify application records that correspond with applications that enable a user to purchase movie tickets (e.g., a ticketing application).

In identifying application records that may be relevant to a current search query, most search servers do not take into account previous search queries received from the same mobile computing device. In some scenarios, a previous search query received from the same mobile computing device can help identify search records that may be more relevant to the current search query. Also, in some scenarios, the previous search query can help identify a particular state of an application that the user of the mobile computing device may want to access. For example, if the search server previously received a search query for a particular movie, then upon receiving the current search query for "movie tickets" the search server can determine that the user may be interested in purchasing movie tickets for the movie specified in the previous search. Consequently, the search server can identify a particular state of the ticketing application that enables the user to purchase tickets for the movie specified in the previous search. By communicating the specific state of the application to the mobile computing device, the user may not have to spend additional time searching for the state within the application.

FIG. 1 illustrates a diagram of a mobile computing device 100 that receives a search query 122 and displays search results 172 in response to the search query 122. The mobile computing device 100 can receive the search query 122 via a search box 118. The search box 118 may be referred to as a search bar. The search box 118 may be displayed by an operating system of the mobile computing device 100. Alternatively, the search box 118 can be displayed by an application. For example, the search box 118 can be displayed by a native application that is installed on the mobile computing device. In some examples, the search box 118 is displayed by a web application that can be accessed via a web browser. Alternatively, the search box 118 may be displayed by an application launcher. The application launcher may be a computer program that launches the applications.

In the example of FIG. 1, the mobile computing device 100 receives a current search query 122c that includes "movie tickets" as search terms. The mobile computing device 100 transmits the current search query 122c to a search server (not shown). Upon transmitting the current search query 122c, the mobile computing device 100 receives the search results 172. The search results 172 may include information regarding websites that are relevant to the current search query 122c. For example, a first search result 172-1 corresponds with the fandango.com website that enables users to purchase tickets for movies. Similarly, a second search result 172-2 corresponds with the amctheaters.com website that enables users to purchase tickets for movies playing at AMC theaters. Lastly, a third search result 172-3 corresponds with the movietickets.com website that allows users to buy tickets for movies. Some of the search results 172 may be advertisements (e.g., the first search result 172-1), while other search results 172 may be referred to as organic search results (e.g., the second and third search results 172-2, 172-3).

In the example of FIG. 1, prior to receiving the current search query 122c, the mobile computing device 100 may have received a previous search query 122p. In this example, the previous search query 122p includes the search terms "Age of Ultron", which is the title of a movie. As illustrated, the search results 172 for the current search query 122c do not take into account the previous search query 122p. As such, if the user intends to buy tickets for the Age of Ultron movie, the user needs to select one of the search results 172 and then provide further user inputs to traverse to a state that corresponds with the Age of Ultron movie.

FIG. 2 illustrates an example mobile computing device 200 that displays search results 272 in response to search queries 222. In this example, the mobile computing device 200 receives "movie tickets" as the current search query 222c. Prior to receiving the current search query 222c, the mobile computing device 200 may have received a previous search query 222p. In this example, the previous search query 222p defines a title of a movie (e.g., "Age of Ultron").

Unlike the search results 172 in FIG. 1, the search results 272 in FIG. 2 are based on the current search query 222c and the previous search query 222p. Specifically, the search results 272 include state previews 274. The state previews 274 are previews of states that correspond with the previous search query 222p. Specifically, the state previews 274 may include information that is displayed by states that correspond with the previous search query 222p. The state previews 274 can also include GUI elements such as buttons from states that correspond with the previous search query 222p. In the example of FIG. 2, a first search result 272-1 corresponds with the native Fandango application—an application that enables users to purchase movie tickets. The first search result 272-1 includes a first state preview 274-1 that corresponds with the previous search query 222p. The native Fandango application may be relevant to the "movie tickets" search query because the Fandango application enables a user to purchase movie tickets. Moreover, the first state preview 274-1 is relevant because it enables the user to purchase tickets for the Age of Ultron movie. Since the first search result 272-1 includes the first state preview 274-1, there is no need for the user to manually traverse to a state of the Fandango application that sells Age of Ultron tickets.

The search results 272 may correspond with native applications that are installed on the mobile computing device 200. For example, the first search result 272-1 corresponds with the native Fandango application. Alternatively, the search results 272 may correspond with web applications that may be accessed via a web browser. For example, the second search result 272-2 corresponds with the movietickets.com website and the third search result 272-3 corresponds with the amctheatres.com website. Some search results 272 may be sponsored (e.g., paid-for by an advertiser). In the example of FIG. 2, the first search result 272-1 is advertised, while the second and third search results 272-2, 272-3 are organic search results (i.e., not sponsored). Upon detecting a selection of a search result 272, the mobile computing device 200 launches the application that corresponds with the search result 272. For example, upon detecting a selection of the first search result 272-1, the mobile computing device 200 can launch the native Fandango application. Similarly, upon detecting a selection of the second search result 272-2, the mobile computing device 200 can open the movieticket.com website via a web browser.

Most applications include numerous states. In some applications, one of the states may be designated as a default state. Upon detecting a selection of a search result 272, the mobile computing device 200 may launch the corresponding application into either the default state or the state associated with the state preview 274. If the mobile computing device 200 detects a user selection of the state preview 274, the mobile computing device 200 can launch the application into the state associated with the state preview 274. For example, if the mobile computing device 200 detects a user selection of the first state preview 274-1, the mobile computing device 200 can launch the native Fandango application into the state that sells tickets for the Age of Ultron movie. However, if the mobile computing device 200 detects that the user selection of a search result 272 occurred outside the state preview 274, the mobile computing device 200 launches the application into its default state.

The previous search query 222p can affect the search results 272 for the current search query 222c, if the previous search query 222p is related to the current search query 222c. In other words, not all previous search queries 222p can have an effect on the search results 272. In some implementations, the previous search query 222p can affect the search results 272 for a current search query 222c, if the mobile computing device 200 received the previous search query 222p within a threshold time period prior to the current search query 222c. In other words, the previous search query 222p may affect the search results 272 for the current search query 222c, if a time difference between a current time associated with the current search query 222c and a previous time associated with the previous search query 222p is less than the threshold time period T. The threshold time period T may be configured by the search server, the mobile computing device 200 and/or a user of the mobile computing device 200. The threshold time period T may be a few seconds, a few minutes or a few hours.

In some implementations, the previous search query 222p may affect the search results 272 for the current search query 222c, if the mobile computing device 200 received the previous search query 222p from approximately the same location as the current search query 222c. In other words, the previous search query 222p may affect the search results 272 for the current search query 222c, if a distance between a current location associated with the current search query 222c and a previous location associated with the previous search query 222p is less than a threshold distance D. The threshold distance D may be configured by the search server, the mobile computing device 200 and/or a user of the mobile computing device 200. The threshold distance D may be a number of feet, meters, kilometers, miles, etc.

In some implementations, the previous search query 222p may affect the search results 272 for the current search query 222c, if the mobile computing device 200 received the previous search query 222p during the same session as the current search query 222c. A server (e.g., a web server, the search server, etc.) may have assigned the mobile computing device 200 a current session ID. If the current session ID is equal to a previous session ID that was assigned to the mobile computing device 200 when the mobile computing device 200 received the previous search query 222p, then the previous search query 222p may affect the search results 272 for the current search query 222c. However, if the mobile computing device 200 received the previous search query 222p and the current search query 222c during different sessions, then the previous search query 222p may not affect the search results 272 for the current search query 222c.

FIG. 3 is a schematic diagram of an example system 300 that may be used to provide search results 272 for a current search query 222c based on the current search query 222c and a previous search query 222p. The system 300 includes the mobile computing device 200 and a search server 400. The mobile computing device 200 and the search server 400 can communicate via a network 310. The network 310 may be a public network such as the Internet. The network 310 may include a wireless network such as a cellular network (e.g., Long Term Evolution (LTE)). The network 310 may include a wired network such as Ethernet or the like.

In operation, the mobile computing device 200 transmits a search request 220 to the search server 400. In response to transmitting the search request 220, the mobile computing device 200 receives a search result object 470 from the search server 400. The search result object 470 includes information that the mobile computing device utilizes to display the search results 272. For example, the search result object 470 can identify one or more native applications. The search result object 470 can also identify particular states of the native applications. Additionally or alternatively, the search result object 470 can identify one or more web applications and particular states within the web applications. The search result object 470 may include sponsored search results (e.g., advertisements) as well as organic search results.

The search request 220 may be a data container such as a JSON file, an XML file or the like. The search request 220 includes the current search query 222c. In addition to including the current search query 222c, the search request 220 may include contextual data that indicates a context of the mobile computing device 200. For example, the contextual data may include a current time 224c. The contextual data may include a current session ID 226c. The current session ID 226c may be a string that a server (e.g., the search server 400) may have assigned to the mobile computing device 200 for the duration of a current session. The contextual data may include a current location 228c of the mobile computing device 200. The contextual data may also include a device ID 230 that identifies the mobile computing device 200. The device ID 230 may be a user name, a PIN or an email address of a user of the mobile computing device 200. Alternatively, the device ID 230 may be an International Mobile Equipment Identifier (IMEI). The contextual data can include sensor measurement values from other sensors such as an accelerometer reading, a gyroscope reading, a magnetometer reading, a device temperature reading, an ambient temperature reading, an ambient light level, etc.

The search server 400 receives the search request 220 from the mobile computing device 200. In some scenarios, the search server 400 may receive the search request 220 through another computing device that is serving as an intermediary. The search server 400 can store the search queries 222 that the search server 400 receives from the mobile computing device 200 and other mobile computing devices. As a result, the search server 400 may store one or more previous search queries 222p that the search server 400 previously received from the mobile computing device 200. In other words, the previous search queries 222p refer to search queries 222 that the search server 200 received prior to receiving the current search query 222c. In addition to storing the search queries 222, the search server 400 may store additional information in association with the search queries 222. For example, upon receiving the current search query 222c, the search server 400 may store the time 224c, the session ID 226c, the location 228c and the device ID 230 in association with the current search query 222c.

Some previous search queries 222p may be related to the current search query 222c. The search server 400 determines a previous search query 222p that is related to the current search query 222c and uses the previous search query 222p, in addition to the current search query 222c, to determine the search results 272 for the current search query 222c. Specifically, the search server 400 may identify an application based on the current search query 222c and a particular state of the application based on a related previous search query 222p. The search server 400 may use a variety of techniques to identify a previous search query 222p that is related to the current search query 222c.

In some implementations, the search server 400 determines that a previous search query 222p is related to the current search query 222c, if the time difference between receiving the previous search query 222p and the current search query 222c is less than a threshold time period T. In other words, a previous search query 222p may be related to the current search query 222c, if the search server 400 received the previous search query 222p within a threshold time period T prior to the current search query 222c. Put another way, the current search query 222c may be related to a particular previous search query 222p, if the search server 400 receives the current search query 222c within a threshold time period T after receiving that particular previous search query 222p. The threshold time period T may be several seconds, several minutes or several hours (e.g., 0-30 seconds, 0-5 minutes or 0-3 hours). The threshold time period T can be configured by a human operator (e.g., an administrator of the search server 400 or a user of the mobile computing device 200). The threshold time period T can be different for different mobile computing devices. For example, different threshold time periods can be associated with different device IDs 230. In some scenarios, a shorter threshold time period (e.g., 0-5 minutes) may be associated with a mobile computing device that initiates a relatively high number of search queries (e.g., more than 20 per day). And, a longer threshold time period (e.g., 2-3 hours) may be associated with a mobile computing device that initiates a relatively low number of search queries (e.g., 2-5 per day).

In some implementations, the search server 400 determines that a previous search query 222p that is related to the current search query 222c, if the previous search query 222p and the current search query 222c were received during the same session. Specifically, a particular previous search query 222p may be related to the current search query 222c, if the current session ID 222c is equal to a previous session ID associated with the previous search query 222p. If the search server 400 received multiple search queries 222 during the current session, then there may be several previous search queries 222p that may be related to the current search query 222c. In such a scenario, the search server 400 can select the previous search query 222p that the search server 400 received most recently. In other words, upon identifying the previous search queries 222p that the search server 400 received during the current session, the search server 400 can select a previous search query 222p that results in the smallest time difference between the times associated with the previous search query 222p and the current search query 222c.

In some implementations, the search server 400 determines that a previous search query 222p is related to the current search query 222c, if the previous search query 222p and the current search query 222c were received from the same location. The search server 400 may determine that the previous search query 222p and the current search query 222c were received from the same location, if a distance between the locations associated with the current search query 222c and the previous search query 222p is less than a threshold distance D. The threshold distance D may be configured by an operator (e.g., a human operator such as an administrator of the search server 400 or a user of the mobile computing device 200). The threshold distance D may be several foot, (e.g., 0-100 foot), several meters (e.g., 0-100 m), several kilometers (e.g., 0-10 km) or several miles (e.g., 0-25 miles). The search server 400 can retrieve the current location 228c from the search request 220. Alternatively, if the search request 200 does not include the current location 228c, the search server 400 may use a variety of techniques to determine the location of the mobile computing device 200. For example, the search server 400 can query a Home Location Register (HLR) with the device ID 230 and receive the current location of the mobile computing device 200 in response to the query.

In operation, the search server 400 may identify one or more applications based on the current search query 222c. For each application, the search server 400 can identify a particular state of the application based on a previous search query 222p that is related to the current search query 222c. The search server 400 can convey information regarding the applications and the states of the applications to the mobile computing device 200. Specifically, the search server 400 can instantiate a data container that represents a search result object 470. Upon instantiating the search result object 470, the search server 400 can write information regarding the applications and the particular states of the applications to the search result object 470. When the mobile computing device 200 receives the search result object 470, the mobile computing device 200 can use the information in the search result object 470 to display the search results 272. As illustrated in FIG. 3, the search results 272 enable a user of the mobile computing device 200 to launch an application into either a default state of the application or a state that the search server 400 determined based on a previous search query 222p. For example, upon detecting a user selection of a state preview 274, the mobile computing device 200 can launch the application into the state that the search server 400 determined based on the previous search query 222p. By contrast, upon detecting a user selection of a search result 272 anywhere outside the state preview 274, the mobile computing device 200 can launch the application into the default state of the application.

Figure 4:
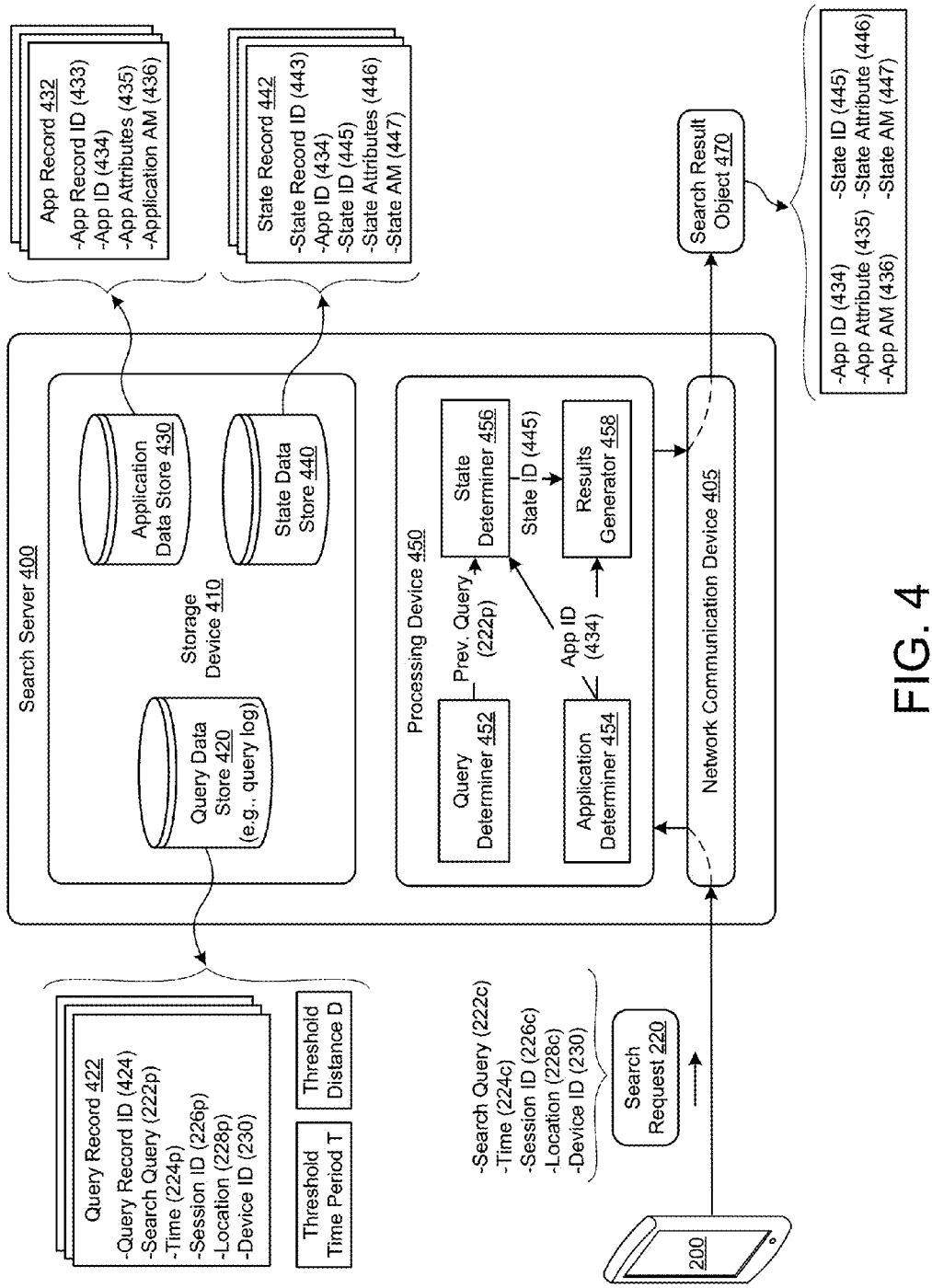
FIG. 4 is a block diagram of a search server that determines search results for a current search query based on previous search queries.

FIG. 4 is an example block diagram of the search server 400. The search server 400 can receive a search request 220 and transmit a search result object 470 in response to the search request 220. The search server 400 includes a network communication device 405, a storage device 410 and a processing device 450. The search server 400 may be implemented by a cloud computing platform. The cloud computing platform may include a collection of remote computing services. The cloud computing platform may include computing resources (e.g., processing device 450). The computing resources may include physical servers that have physical central processing units (pCPUs). The cloud computing resources may include storage resources (e.g., storage device 410). The storage resources may include database servers that support NoSQL, MySQL, Oracle, SQL Server, or the like. The cloud computing platform may include networking resources (e.g., network communication device 405). For example, the networking resources may distribute incoming requests for event notifications across multiple virtual private servers. Example cloud computing platforms include Amazon Web Services®, and Google Cloud Platform®.

The network communication device 405 communicates with a network (e.g., the network 310 shown in FIG. 3). The network communication device 405 may include a communication interface that performs wired communication (e.g., via Ethernet, Universal Serial Bus (USB) or fiber-optic cables). The network communication device 405 may perform wireless communication (e.g., via Wi-Fi, a cellular network, or satellites). The network communication device 405 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE) or LTE-Advanced). The transceiver may operate in accordance with a Universal Serial Bus (USB) specification (e.g., via a USB port).

The storage device 410 stores data. The storage device 410 may include one or more computer readable storage mediums. For example, the storage device 410 may include solid state memory devices, hard disk memory devices, optical disk drives, read-only memory and/or nanotube-based storage devices. The storage device 410 may be connected to the processing device 450 via a bus and/or a network. Different storage mediums within the storage device 410 may be located at the same physical location (e.g., in the same data center, same rack, or same housing). Different storage mediums of the storage device 410 may be distributed (e.g., in different data centers, different racks, or different housings). In some implementations, the storage device 410 may be a part of the processing device 450. For example, the storage device 410 may be a cache (e.g., a data cache) that is installed on or close to a central processing device (CPU). The storage device 410 may implement (e.g., store) a query data store 420, an application data store 430 and a state data store 440.

The query data store 420 can be used to identify a previous search query 222p that may be related to the current search query 222c. The query data store 420 stores query records 422 that correspond with search queries 222 that search server 400 receives. A query record 422 may include a query record ID 424. The query record ID 424 may include a string that identifies the query record 422. In addition to storing a previous search query 222p, the query record 422 may store additional information associated with the previous search query 222p. For example, the query record 422 may store a previous time 224p that is associated with the previous search query 222p. The previous time 224p may be a time at which the search server 400 received the previous search query 222p or a time at which the mobile computing device 200 sent the previous search query 222p to the search server 400. Similarly, the query record 422 may store a previous session ID 226p that the search server 400 may have assigned to the mobile computing device 200 at the previous time 224p. The query record 422 may also store a previous location 228p of the mobile computing device 200 at the previous time 224p. Lastly, the query record 422 may store a device ID 230 that identifies the mobile computing device 200.

The query data store 420 may include one or more databases, indices (e.g., inverted indices), tables, Look-Up Tables (LUT), files, and/or other data structures. The query data store 420 may be referred to as a query log that may be stored in a cache. The query data store 420 may include one or more mapping mechanisms that map information stored in the query data store 420 to one or more query record IDs 424. For example, a particular mapping mechanism may map device IDs 230 to query record IDs 424. In this example, the processing device 450 can query the mapping mechanism with a particular device ID 230 and receive query record IDs 424 that are associated with that particular device ID 230. Similarly, another mapping mechanism can map the previous session IDs 226p to query record IDs 424. Some mapping mechanisms may map multiple data types to the query record IDs 424. For example, a mapping mechanism can map device IDs 230 and the previous session IDs 226p to query record IDs 424. In this example, the processing device 450 can query the mapping mechanism with the device ID 230 and the current session ID 226c. In response to such a query, the processing device 450 can receive query record IDs 424 for query records 422 that store previous search queries 222p that the search server 400 received during the current session. The mapping mechanism(s) may be implemented using indices (e.g., inverted indices), tables (e.g., look-up tables), files and/or other data structures.

In addition to storing the query records 422, the query data store 420 may also store a threshold time period T. The threshold time period T may be a string (e.g., a value) that refers to a block of time that spans several seconds (e.g., 0-30 seconds), several minutes (e.g., 0-30 minutes) or several hours (e.g., 0-3 hours). The threshold time period T can be used to identify a previous search query 222p that may be related to the current search query 222c. For example, the search server 400 can compute a time difference between the previous time 224p associated with a particular previous search query 222p and the current time 224c associated with the current search query 222c. If the time difference is less than the threshold time period T, then that particular previous search query 222p may be related to the current search query 222c. On the other hand, if the time difference is greater than the threshold time period T, then that particular previous search query 222p may not be related to the current search query 222c.

Similarly, the query data store 420 may also store a threshold distance D. The threshold distance D may include a string (e.g., a value) that refers to a distance. The distance may be several feet (e.g., 0-10 feet), several meters (e.g., 0-10 m), several kilometers (e.g., 0-10 km) or several miles (e.g., 0-10 mi). The threshold distance D can be used to identify a previous search query 222p that may be related to the current search query 222c. For example, the search server 400 can compute a distance between the previous location 228p associated with a particular previous search query 222p and the current location 228c associated with the current search query 222c. If the computed distance is less than the threshold distance D, then that particular previous search query 222p may be related to the current search query 222c. On the other hand, if the computed distance is greater than the threshold distance D, then that particular previous search query 222p may not be related to the current search query 222c.

The application data store 430 can be used to search for applications that may be relevant to the current search query 222c. The application data store 430 stores application records 432 that correspond with applications. An application record 432 may correspond with a native application that can be installed on the mobile computing device 200. Alternatively, an application record 432 may correspond with a web application (e.g., a webpage) that may be accessed via a web browser. An application record 432 may include an application record ID 433 that identifies the application record 432. An application record 432 may include an application ID 434 that identifies the application that corresponds with the application record 432. An application record 432 may include various application attributes 435. Example application attributes 435 include a title of the application, a description for the application, an image that represents the application, a review of the application, a rating of the application, etc. An application record 432 may include an application access mechanism 436 that can be used to access the application. The application access mechanism 436 may a string that identifies the application and provides access to the application. Example application access mechanisms 436 include an application resource identifier (ARI), a uniform resource locator (URL) and/or a script that includes computer-readable instructions that can be executed by a computing processor of the mobile computing device 200.

The application data store 430 may include one or more databases, indices (e.g., inverted indices), tables, Look-Up Tables (LUT), files, and/or other data structures. The application data store 430 may include a mapping mechanism that maps a first type of data to a second type of data. In some implementations, a mapping mechanism maps keywords to application record IDs 433. In such implementations, the processing device 450 can query the mapping mechanism with search terms included in the current search query 222c and receive application record IDs 433 that may be relevant to the current search query 222c. For example, the application data store 430 may include an inverted index that maps keywords to application record IDs 433. The processing device 450 can query the inverted index with search terms (e.g., tokenized search terms) and receive application record IDs 433 in return. The keywords that map to the application record IDs 433 may include some of the application attributes 435 such as a title or a name of the application, phrases from a description of the application, etc. The mapping mechanism(s) may be implemented using indices (e.g., inverted indices), tables (e.g., look-up tables), files and/or other data structures.

The state data store 440 can be used to determine states that may be relevant to a previous search query 222p that is related to the current search query 222c. For example, after determining an application that may be relevant to the current search query 222c, the processing device 450 may use the state data store 440 to determine a particular state of the application that may be relevant to a previous search query 222p. The state data store 440 stores state records 442 that correspond with state of applications (e.g., native applications and/or web applications). A state record 442 may include a state record ID 443 that identifies the state record 442. A state record 442 may include a state ID 445 that identifies the state corresponding with the state record 442. A state record 442 may include the application ID 434 of the application that includes the corresponding state. The state record 442 may store state attributes 446 that are associated with the corresponding state. The state attributes 446 may include a state title, a state description, a state image, etc. The search server 400 may use the state attributes 446 to generate the state previews 274 shown in FIGS. 2 and 3. Lastly, the state record 442 may include a state access mechanism (SAM) 447 that can be used to access the state. The SAM 447 may include a string that refers to the state and provides access to the state. In some scenarios, the SAM 447 may include a uniform resource identifier (URI) such as an application resource identifier (ARI) (e.g., uniform resource locator (URL) such as a web URL). In some scenarios, the SAM 447 may include a script that can be executed by the computing processor of the mobile computing device 200.

The state data store 440 may include one or more databases, indices (e.g., inverted indices), tables, Look-Up Tables (LUT), files, and/or other data structures. The state data store 440 may include a mapping mechanism that maps a first type of data to a second type of data. In some implementations, a mapping mechanism maps keywords to state record IDs 443. In such implementations, the processing device 450 can query the mapping mechanism with search terms included in a previous search query 222p and receive state record IDs 443 that may be relevant to the previous search query 222p. The keywords that the mapping mechanism maps to the state record IDs 443 may include state attributes 446 such as a title or a name of the state, phrases from a description of the state, etc. The mapping mechanism(s) may be implemented using indices (e.g., inverted indices), tables (e.g., look-up tables), files and/or other data structures. In some implementations, the processing device 450 may utilize the Lucene Software Libraries by the Apache Software Foundation to search for information stored in the state data store 440.

In the example of FIG. 4, the application data store 430 and the state data store 440 are shown as separate data stores. However, in some implementations, the application data store 430 and the state data store 440 may be combined into a single data store. The search server 400 can receive the information that is stored in the application data store 430 and the state data store 440 from a scraper and/or a crawler (e.g., a web scraper and/or a web crawler). Alternatively, the search server 400 can employ techniques that are typically used by scrapers and crawlers to gather the information stored in the application data store 430 and the state data store 440. In some scenarios, the search server 400 may receive the information stored in the application data store 430 and the state data store 440 from an operator (e.g., a human operator such as an administrator of the search server 400).

The processing device 450 may include a collection of one or more computing processors that execute computer readable instructions. The computing processors of the processing device 450 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 450 may execute computer-readable instructions corresponding with a query determiner 452, an application determiner 454 and a state determiner 456.

In operation, the search server 400 receives a search request 220 that includes a current search query 222c. The query determiner 452 determines a previous search query 222p that may be related to the current search query 222c. The application determiner 454 determines one or more applications that may be relevant to the current search query 222c. For each application determined by the application determiner 454, the state determiner 456 determines a particular state of the application that may be relevant to previous search query 222p determined by the query determiner 452.

The query determiner 452 may use various techniques to determine a previous search query 222p that may be related to the current search query 222c. In some implementations, the query determiner 452 determines that a previous search query 222p may be related to the current search query 222c, if the search server 400 received the previous search query 222p within the threshold time period T prior to the current search query 222c. The query determiner 452 can query the query data store 420 with the device ID 230 and the current time 224c to identify a previous search query 222p that the search server 400 received from the mobile computing device 200 within the threshold time period T prior to the current time 224c.

The query determiner 452 can query the query data store 420 by querying a mapping mechanism that maps device IDs 230 to query record IDs 424. In response to querying the query data store 420, the query determiner 452 receives query record IDs 424 for query records 422 that correspond with the device ID 230 included in the search request 220. The query determiner 452 can filter out query records 422 that the search server 400 received outside the threshold time period T. If there are multiple query records 422 within the threshold time period T, the query determiner 452 can select the most recent query record 422. For each query record 422 within the threshold time period T prior to the current time 224c, the query determiner 452 can compute a time difference between the current time 224c and the previous time 224p stored in the query record 422. After computing the time differences, the query determiner 452 can select the query record 422 that is associated with the smallest time difference.

In some implementations, the query determiner 452 determines that a previous search query 222p may be related to the current search query 222c, if a distance between the previous location 228p and the current location 228c is less than the threshold distance D. The query determiner 452 can query the query data store 420 with the device ID 230 and the current location 228c to identify a previous search query 222p that the search server 400 received from a previous location 228p, which is less than the threshold distance D from the current location 228c. Querying the query data store 420 may refer to querying a mapping mechanism that maps device IDs 230 and previous locations 228p to query record IDs 424. If there is a set of previous search queries 222p that are equidistant from the current location 228c, then the query determiner 452 can select the most recent previous search query 222p from the set.

In some implementations, the query determiner 452 determines that a previous search query 222p may be related to the current search query 222c, if the search server 400 received the previous search query 222p and the current search query 222c during the same session. The query determiner 452 can query the query data store 420 with the device ID 230 and the current session ID 226c. Querying the query data store 420 may refer to querying a mapping mechanism that maps device IDs 230 and previous session IDs 226p to query record IDs 424. In response to the query, the query determiner 452 may receive a query record ID 424 for a previous search query 222p that the search server 400 received during the current session. If there is a set of previous search queries 222p that the search server 400 received during the current session, then the query determiner 452 can select the most recent previous search query 222p from the set.

The application determiner 454 determines one or more applications that may be relevant based on the current search query 222c. Specifically, the application determiner 454 identifies one or more application records 432 in response to receiving the current search query 222c. In some implementations, the application determiner 454 queries the application data store 430 with one or more search terms included in the current search query 222c. Querying the application data store 430 may refer to querying a mapping mechanism (e.g., an inverted index) that maps keywords to application record IDs 433. In response to the query, the application determiner 454 receives an application record IDs 433 for an application record 432 that may be relevant to the current search query 222c. If the application determiner 454 receives a set of application record IDs 433, then the application determiner 454 can score the application records 432 in the set and select a subset of application records that scored the highest. The application determiner 454 can use a variety of techniques to score the application records 432. For example, the application determiner 454 may use a scoring model that uses various scoring features to score the application records 432 in the set. The scoring model may include a machine-learned model that computes a set of scoring features for each application record 432, and determines the score for the application record 432 based on the scoring features.

The state determiner 456 receives an application ID 434 from the application determiner 454 and determines a particular state of the application that may be relevant based on the previous search query 222p identified by the query determiner 452. The state determiner 456 can use various techniques to determine a state that may be relevant based on the previous search query 222p. In some implementations, the state determiner 456 queries the state data store 440 with the application ID 434 determined by the application determiner 454 and the previous search query 222p determined by the query determiner 452. Querying the state data store 440 may refer to querying a mapping mechanism that maps application IDs 434 and keywords to specific state record IDs 443. In response to the query, the state determiner 456 may receive a state record ID 443 that corresponds with a particular state of the application. If the state determiner 456 receives a set of state record IDs 443, then the state determiner 456 can score the state records 442 in the set and select the state record 442 that scored the highest. The state determiner 456 can use a variety of techniques to score the state records 442. For example, the state determiner 456 may use a scoring model that uses various scoring features to score the state records 442 in the set.

In some implementations, instead of determining a state that is different from the default state, the state determiner 456 can use the previous search query 222p to parameterize (e.g., populate) data fields displayed by the default state. For example, if the current search query 222c is for "movie tickets" and the previous search query 222p is for the "Age of Ultron" movie, then the state determiner 456 can parameterize a movie data field displayed by the default state of a movie tickets application with "Age of Ultron". The state determiner 456 can identify specific data fields that are displayed by the default state of an application by identifying metatags that correspond with a schema vocabulary. For example, the state determiner 456 can identify the movie data field by identifying the following string in a metatag: "http://schema.org/Movie".

In some implementations, the state determiner 456 can parameterize the data fields. The state determiner 456 can use a mapping mechanism to map the search terms in the previous search query 222p to the data fields in the default state. For example, the mapping mechanism may map "Age of Ultron" to the movie data field. In general, the mapping mechanism can map a set of keywords to a set of data types associated with the data fields. The state determiner 456 can query the mapping mechanism with the search terms in the previous search query 222p. In response to the query, the state determiner 456 can receive an indication of the data type associated with the data field that can be populated with the search terms. For example, upon querying the mapping mechanism with "Age of Ultron", the state determiner 456 can receive an indication that "Age of Ultron" is a movie name. Upon determining that "Age of Ultron" is a movie name, the state determiner 456 can populate a data field that accepts movie names (e.g., the movie name field).

In some implementations, the state determiner 456 determines a state that corresponds with an entity that is common to the current search query 222c and the previous search query 222p. The state determiner 456 can identify a first entity based on the search terms of the current search query 222c. The state determiner 456 can use a mapping mechanism that maps keywords to entities. Specifically, the state determiner 456 can query the mapping mechanism with the search terms from the current search query and receive information regarding the first entity. Similarly, the state determiner 456 can identify a second entity based on the search terms of the previous search query 222p.

Upon identifying the first entity and the second entity, the state determiner 456 can identify a third entity that is related to both the first entity and the second entity. The state determiner 456 can use an entity graph to identify the third entity. The entity graph may include graph nodes that represent entities and graph edges that represent connections (e.g., relationships) between the entities. For example, the entity graph may include a first graph node that represents the first entity and a second graph node that represents the second entity. The state determiner 456 can identify the third entity by identifying a third graph node that is connected to both the first graph node and the second graph node. Moreover, the third graph node may be approximately equidistant from the first and second graph nodes. Furthermore, the third graph node may be on a path that represents the shortest path between the first and second graph nodes.

The third graph node may store various information regarding the third entity. For example, the third graph node can store the name of the entity, a type of the entity, etc. The third graph node may also store applications and states of applications that are associated with the third entity. For example, the third graph node may store an application ID 434 and a state ID 445 of a state that is associated with the third entity. Upon identifying the third entity, the state determiner 456 can select the state associated with the third entity. If the third entity is associated with multiple states of the application, the state determiner 456 can use various scoring techniques to score the states and select the state that scored highest.

The result generator 458 generates the search result object 470 and transmits the search result object 470 via the network communication device 405. Generating the search result object 470 may include instantiating a data container that represents the search result object 470. The data container may be a JSON file, an XML file, or any other data object that can transport information regarding the application(s) determined by the application determiner 454 and the state(s) determined by the state determiner 456. Upon instantiating the data container, the results generator 458 writes information regarding the application(s) and the state(s) to the data container. The results generator 458 may write the following application-related information to the data container: application ID 434, one or more application attributes 435 (e.g., name of the application, an image associated with the application, etc.) and/or the application access mechanism 436. Similarly, the results generator 458 may write the following state-related information to the data container: the state ID 445, one or more state attributes 446 (e.g., name of the state, an image associated with the state, etc.) and/or the state access mechanism 447. The information in the search result object 470 is used by the mobile computing device 200 to display the search results 272 and the state previews 274 shown in FIGS. 2 and 3. The search result object 470 may include any other suitable information that can be used by the mobile computing device 200 to display the search results 272 and the state previews 274 shown in FIGS. 2 and 3.

Figure 5:
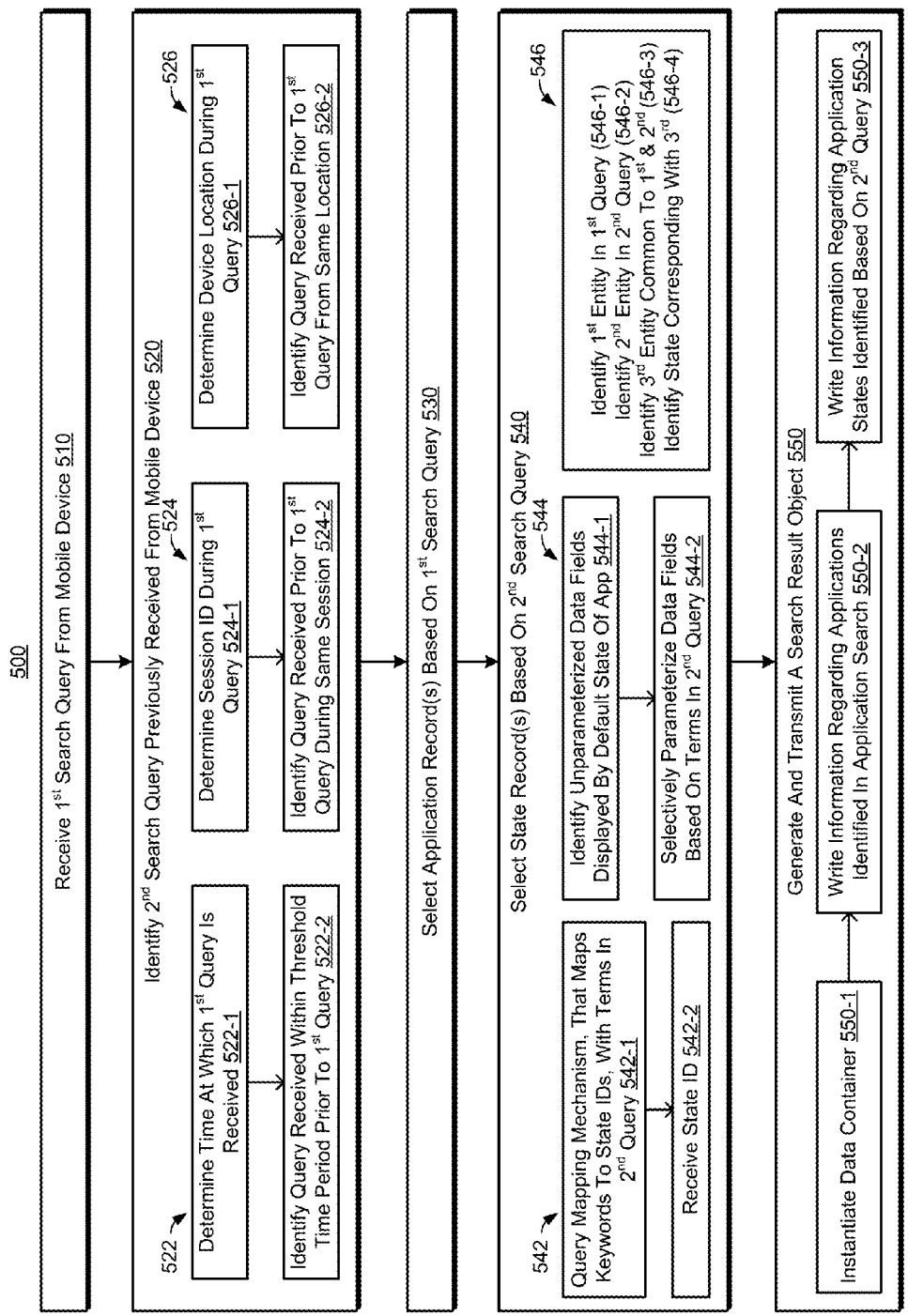
FIG. 5 is a block diagram that illustrates example methods that can be executed by the search server shown in FIG. 4.

FIG. 5 is a block diagram of an example method 500 that may be executed by a server (e.g., the search server 400 shown in FIG. 4). The method 500 may be implemented as a set of computer-readable instructions that are executed by a computing processor (e.g., a computing processor of the processing device 450 shown in FIG. 4). Generally, the search server receives a current search query from a mobile computing device (at 510). The search server identifies a previous search query, from the same mobile computing device, that may be related to the current search query (at 520). The search server identifies one or more applications that may be relevant based on the current search query (at 530). For each application, the search server identifies a particular state of the application that may be relevant based on the previous search query (at 540). The state(s) identified at 540 may be different from a default state of the application. At 550, the search server transmits a search result object that includes information regarding the application(s) identified at 530 and the state(s) identifies at 540.

Referring to 510, the search server may receive a search request. The search request may include the current search query. The current search query may include one or more search terms. The search server may receive the search request from a mobile computing device. The search server can receive the search request directly from the mobile computing device or via another computing device that may be serving as an intermediary. The search request may include additional information such as a current time and/or a current time zone of the mobile computing device. The search request may include a current session ID. The current session ID may be a string that identifies a current session. The current session ID may have been assigned to the mobile computing device by a server (e.g., the search server). The search request may include a current location of the mobile computing device. The search request may also include a device ID. The device ID may be a string that identifies the mobile computing device. The device ID may be a user name, a personal identification number (PIN) or an email address associated with a user of the mobile computing device. Alternatively, the device ID may be an International Mobile Equipment Identity (IMEI), an International Mobile Subscriber Identity (IMSI), a serial number, a phone number, a MAC address, an IP address, etc.

Referring to 520, the search server can use various techniques to identify a previous search query that may be related to the current search query. The previous search query refers to a search query that the search server received from the mobile computing device prior to receiving the current search query. In some implementations, a previous search query may be related to the current search query, if the search server received the previous search query within a threshold time period prior to receiving the current search query (at 522). In some implementations, a previous search query may be related to the current search query, if the search server received the previous search query during the same session as the current search query (at 524). In some implementations, a previous search query may be related to the current search query, if the search server received the previous search query from approximately the same location as the current search query (at 526).

Referring to 522, the search server determines a current time associated with the current search query (at 522-1). In some implementations, the search request may indicate a time at which the mobile computing device sent the search request to the search server. In such implementations, the search server can determine the current time by retrieving the time from the search request. If the search request indicates a time zone of the mobile computing device, the search server can determine the current time by determining the time in the time zone indicated by the search request. If the search request does not indicate the time or the time zone, the search server can determine the current time by retrieving the time at which the search server received the search request. The search server may use an internet time server (e.g., a NIST server) to determine the current time.

At 522-2, the search server identifies a previous search query that the search server received within a threshold time period prior to receiving the current search query. The search server may include a query data store that stores previous search queries that the search server received from various mobile computing devices. For example, the query data store can store query records that correspond with the previous search queries. Each query record may include a query record ID that identifies the query record. In addition to storing a previous search query, a query record can also store a previous time that is associated with the previous search query. The previous time may be a time at which the search server received the previous search query. The query data store may also store the threshold time period. The search server may receive the threshold time period from an operator (e.g., a human operator such as an administrator of the search server). The threshold time period may be several seconds (e.g., 0-30 seconds), several minutes (e.g., 0-30 minutes) or several hours (e.g., 0-3 hours).

The search server can identify all previous search queries that the search server received from the mobile computing device that sent the current search query. For example, the search server can query a mapping mechanism that maps a device ID of the mobile computing device to query record IDs that store the previous search queries from the mobile computing device. The search server can filter out query records that correspond with times that are outside the threshold time period prior to the current time. If there are multiple query records that are within the threshold time period, the search server can select the most recent previous search query as a previous search query that may be related to the current search query. In some implementations, the search server (e.g., the query data store 420) may include an inverted index that maps device IDs and times at which the search server received a search query from a mobile computing device identified by the device ID to the search query. In such implementations, the search server can query the inverted index with a device ID and a time range. In return, the search server can receive the previous search query received during the time range. The time range can end at a first time at which the search server received the current search query, and start a threshold time period prior to the first time.

Referring to 524, a previous search query may be related to the current search query, if the search server received the previous search query and the current search query during the same session. At 524-1, the search server determines a current session ID associated with the current search query. If the search request includes the current session ID, the search server can retrieve the current session ID from the search request. Alternatively, if the search server assigned the current session ID to the mobile computing device, the search server can retrieve the current session ID associated with the mobile computing device from a session data store that stores session IDs. For example, the search server may querying the session data store with a device ID and a current time, and receive the current session ID in response to the query. The search server may assign a session ID to a mobile computing device when the mobile computing device launches a web browser, or opens a search page. The search server may assign a new session ID each time the web browser is launched, or the search page is opened.

At 524-2, the search server identifies a previous search query from the mobile computing device that was received during the same session as the current search query. The query records that store the previous search queries may also store session IDs that are associated with the previous search queries. The session IDs associated with the previous search queries may be referred to as previous session IDs. A previous session ID associated with a previous search query may be a session ID that was assigned to the mobile computing device when the mobile computing device sent the previous search query. The search server can query the query data store with the device ID and the current session ID, and receive query record IDs for previous search queries that were received during the current session. If there are multiple previous search queries that were received during the current session, the search server can select the most recent previous search query as a previous search query that may be related to the current search query.

Referring to 526, a previous search query may be related to the current search query, if the previous search query was received from the same location as the current search query. At 526-1, the search server determines a current location associated with the current search query. If the search request includes a location, the search server can determine the current location by retrieving the location from the search request. If the search request does not include a location, the search server can use various techniques to determine the location of the mobile computing device. For example, the search server can query a Home Location Register (HLR) with a device ID and receive the location of the mobile computing device in response to the query.

At 526-2, the search server identify a previous search query that was received from approximately the same location. The query records that store the previous search queries may also store locations in association with the previous search queries. A location that is associated with a previous search query may be referred to as a previous location. The query data store may include a mapping mechanism that maps device IDs and locations to corresponding query record IDs. The search server can query the mapping mechanism with the device ID and the current location. In response to the query, the search server may receive query record IDs for previous search queries that were received from the current location. If there are multiple previous search queries that were received from the current location, the search server can select the most recent previous search query as a previous search query that may be related to the current search query.

The search server may determine that a previous search query was received from the same location as the current search query, if a distance between the previous location and the current location is less than a threshold distance. The search server may receive the threshold distance from an operator (e.g., a human operator such as an administrator of the search server). The search server may store the threshold distance in the query data store. The threshold distance may be several feet (e.g., 0-10 feet), several meters (e.g., 0-10 m), several kilometers (e.g., 0-10 km) or several miles (e.g., 0-10 mi). In some implementations, the threshold distance may be different for different mobile computing devices. In such implementations, the search server can determine the threshold distance associated with the mobile computing device by querying a mapping mechanism that maps device IDs to corresponding threshold distances.

Referring to 530, the search server identifies one or more applications that may be relevant to the current search query. The search server may store an application data store that stores application records that correspond with applications. An application may refer to a native application that can be installed on a mobile computing device or a web application (e.g., a webpage) that may be accessed via a web browser. An application record may include an application record ID that identifies the application record. Furthermore, the application record for an application may store various application attributes. Example application attributes include a title of the application, a description of the application, a review of the application, a rating of the application, a location at which the application may be relevant, a time duration during which the application may be relevant, etc. The application data store may include one or more mapping mechanisms that map one type of data to another type of data. For example, a mapping mechanism can map keywords to application record IDs. The keywords may include application attributes such as titles of the application, phrases from the descriptions of the application, etc.

The search server can employ various search techniques to identify one or more application records that may be relevant to the current search query. For example, the search server can query the mapping mechanism, which maps keywords to application record IDs, with search terms from the current search query. In response to the query, the search server may receive application record IDs that may be relevant to the current search query. In addition to identifying application records based on the search terms of the current search query, the search server can use additional information from the search request in order to identify the application records. For example, an application record may indicate locations where the corresponding application may be relevant. In such examples, if the current location of the mobile computing device is more than a threshold distance from the locations indicated by the application record, the search server can filter out the application record. On the other hand, if the current location is within the threshold distance of the locations indicated by the application record, the search server can determine that the application record may be relevant to the current search query. The search server can use other contextual data (e.g., time, temperature, ambient lighting level, ambient sound level, etc.) to identify application records that may be relevant to the current search query.

If the application search yields multiple application records that may be relevant to the current search query, the search server may score the application records. The search server can use a scoring model to score the application records. The scoring model may use various scoring features such as location, time, etc. In some examples, a first application record that is associated with a first location that is closer to the current location may be scored higher than a second application record that is associated with a second location that is farther from the current location. Similarly, a first application record that is associated with a first time that is close to the current time may be scored higher than a second application record that is associated with a second time that is farther from the current time. After scoring the application records, the search server may select a finite number of application records (e.g., 3-5 of the highest scoring application records).

Referring to 540, the search server can use the previous search query (identified at 520) to determine a particular state of the application (identified at 530). The search server may apply various techniques that use the previous search query to determine the particular state of the application. For example, the search server can search state records in a state data store to identify a state that may be relevant based on the previous search query (at 542). Alternatively, the search server can use the search terms from the previous search query to parameterize certain data fields displayed by a default state of the application (at 544). Parameterizing the data fields may include parameterizing a URL template. Alternatively, the search server can identify a state that corresponds with an entity that is common to the entities associated with the current search query and the previous search query (at 546).

Referring to 542, the search server may include a state data store that stores state records that correspond with states of applications. The state records may correspond with state of native applications and/or states of web applications. A state record may include a state record ID that identifies the state record. Additionally, a state record may include various state attributes such as a title of the state, a description of the state, a review of the state, a rating of the state, etc. The state data store may include one or more mapping mechanisms that map one type of data to another type of data. For example, a mapping mechanism may map keywords to state record IDs. The keywords may include state attributes such as the title of the state, phrases from the descriptions of the states, etc. At 542-1, the search server can query the mapping mechanism with search terms from the previous search query. In response to the query, the search server may receive a state record ID for a state record that may be relevant to the previous search query (at 542-2). If the search server receives multiple state record IDs, the search server can score the state records and select the state record associated with the highest score.

Referring to 544, in some implementations, instead of using the previous search query to identify a state that is different from the default state, the search server can use the search terms from the previous search query to parameterize data fields displayed by the default state of the application. The search server can identify unparameterized data fields that the default state of the application displays (at 544-1). The search server can identify the data fields by identifying metatags that use phrases from a schema vocabulary (e.g., schema.org). For example, the search server can identify a data field that accepts information related to a movie by identifying the following string: "http://schema.org/Movie".

Upon identifying the type of data that an unparameterized data field can accept, the search server may use the search terms in the previous search query to parameterize the data field (at 544-2). The search server can determine whether the search terms in the previous search query are suitable for the data field displayed in the default state. In other words, the search server can determine whether a data type of the search terms is the same as the data type that the data field accepts. For example, once the search server determines that the phrase "Age of Ultron" in the previous search query refers to a movie name, the search server can parameterize a data field that accepts movie names with "Age of Ultron". In order to determine the data type of the search terms, the search server can utilize a mapping mechanism that maps keywords to data types. For example, the mapping mechanism may map "Age to Ultron" to movie name.

Referring to 546, in some implementations, the state may correspond with an entity that is common to entities associated with the current search query and the previous search query. Furthermore, the search server may store an entity graph that includes various graph nodes. Each graph node may be associated with an entity and store information regarding the entity. A graph node may also store information regarding a state of an application that corresponds with the entity that the graph node represents. The entity graph may include various graph edges that connect the graph nodes. The graph edges may represent connections or relationships between the entities. The entity graph may include a mapping mechanism that maps keywords to entities represented by the graph nodes.

At 546-1, the search server identifies a first entity associated with the current search query. The search server may query a mapping mechanism (e.g., an inverted index indexing entities) with search terms from the current search query and receive information regarding the first entity in response to the query. The first entity may be represented by a first graph node in the entity graph. At 546-2, the search server identifies a second entity associated with the previous search query. The search server may query the mapping mechanism with search terms from the previous search query and receive information regarding the second entity in response to the query. The second entity may be represented by a second graph node in the entity graph. At 546-3, the search server identifies a third entity that is connected to the first entity and the second entity. The search server may identify the third entity by identifying a third graph node that is connected to the first graph node and the second node. The third graph node may be positioned on a path between the first graph node and the second graph node. The path may be the shortest path between the first graph node and the second graph node. Lastly, the search server identifies a state that corresponds with the third entity (at 546-4). The search server may retrieve information regarding the state from the third graph node.

Referring to 550, the search server generates and transmits a search result object to the mobile computing device. The search result object includes information regarding the application (identified at 530) and the state (identified at 540). Generating the search result object may include instantiating a data container (at 550-1). The data container may be a JSON object, an XML file or any other data structure that can be used to communicate information. Upon instantiating the data container, the search server writes information regarding the identified application to the data container (at 550-2). The information regarding the identified application may include an application ID that identifies the application, an image associated with the application and an application access mechanism that can be used to access the application (e.g., the default state of the application). At 550-3, the search server writes information regarding the state identified at 540 to the data container. The information regarding the state may include a state ID that identifies the state, an image associated with the state and a state access mechanism that can be used to access the state. The search server can transmit the search result object to the mobile computing device via a network communication device of the search server.

An application may refer to computer software that causes a computing device to perform a task. In some examples, an application may be referred to as an "application," an "app," or a "program." Example applications include, but are not limited to, system diagnostic applications, system management applications, system maintenance applications, word processing applications, spreadsheet applications, messaging applications, media streaming applications, social networking applications, gaming applications, food ordering applications, ride sharing applications, ticket purchasing applications, crowd-sourced review applications, etc.

The storage device 410 may be referred to as a non-transitory memory that may include physical devices that are used to store programs (e.g., sequences of instructions) or data (e.g., program state information) on a temporary or permanent basis for use by the processing device 450. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
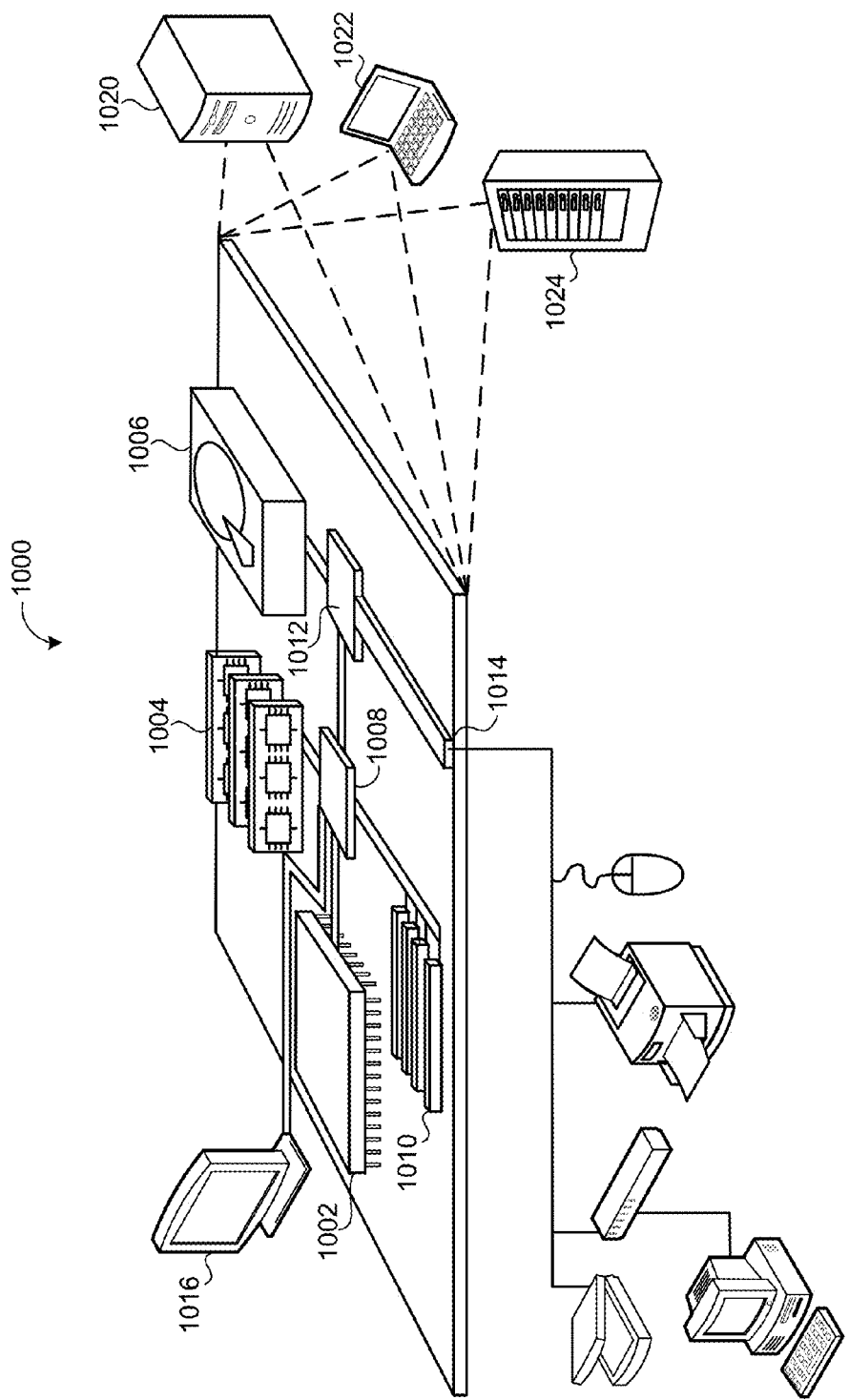
FIG. 6 is a schematic diagram of an example computing device that can be used to implement the mobile computing device and/or the search server shown in FIG. 3.

FIG. 6 is a block diagram of an example computing device 1000 that may be used to implement the systems and methods described in this document. For example, the computing device 1000 may be used to implement the mobile computing device 200 and/or the search server 400 shown in FIGS. 2, 3 and 4. Moreover, the computing device 1000 may execute a set of computer-readable instructions that implement the method 500 shown in FIG. 5. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a graphical user interface (GUI) on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In some implementations, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In some implementations, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A search server comprising:
   a network communication device;
   a storage device comprising:
   a query log that stores search queries that the search server receives, wherein each search query is stored in association with (i) a device identifier (ID) that identifies a mobile computing device that sent the search query and (ii) a time at which the search server received the search query, wherein each search query in the query log is related with a session identifier (ID) that indicates a session assigned to the mobile computing device when the mobile computing device transmitted the search query; and an application data store that stores application records, wherein each application record stores information regarding an application;

a state data store that stores state records, wherein each state record stores information regarding an application state; and a memory storing computer-readable instructions;

a processing device that executes the computer-readable instructions, wherein, when executed by the processing device, the computer-readable instructions cause the processing device to:

receive, via the network communication device, a search request from a mobile computing device, the search request comprising (i) a device ID that identifies the mobile computing device and (ii) a first search query that comprises one or more search terms;

determine a first time at which the search server received the search request with the first search query;

determine a second search query that the search server previously received from the mobile computing device at a second time, wherein the determining the second search query comprises:

determining a first session ID associated with the mobile computing device when the mobile computing device transmitted the first search query; and querying the query log with the device ID and the first session ID;

determine that a time difference between the first time and the second time is less than a threshold time period;

select an application record from the application data store based on the search terms of the first search query;

select a state record that corresponds to an application state of the application associated with the selected application record based on search terms of the second search query;

generate a search result object that comprises information from the application record selected based on the first search query, and the state record selected based on the second search query, wherein the generation of the search result object is based on the determined time difference; and transmit the search result object to the mobile computing device.

2. The search server of claim 1, wherein determining the second search query comprises:

retrieving the device ID from the search request;

querying the query log with the device ID, and a time range that extends for the threshold time period prior to the first time; and receiving the second search query from the query log, the second search query being received at the search server within the time range.

3. The search server of claim 1, wherein each search query in the query log is associated with a device location that indicates the location of the mobile computing device when the mobile computing device transmitted the search query; and wherein determining the second search query comprises:

determining a first location of the mobile computing device when the mobile computing device transmitted the first search query;

querying the query log with the device ID and the first location; and receiving the second search query from the query log, the second search query being associated with a second location that is within a threshold distance of the first location.

4. The search server of claim 1, wherein determining the second search query comprises:

receiving the second search query from the query log, the second search query being associated with a second session ID that is equal to the first session ID.

5. The search server of claim 1, wherein selecting the application record comprises:

querying a mapping mechanism of the application data store with the search terms of the first search query, wherein the mapping mechanism maps keywords to application record IDs that identify the application records; and receiving one or more application record IDs from the application data store in response to the querying.

6. The search server of claim 1, wherein selecting the state record comprises:

querying a mapping mechanism of the state data store with the search terms of the second search query, wherein the mapping mechanism maps keywords to state record IDs that identify the state records; and receiving one or more state record IDs from the state data store in response to the querying.

7. The search server of claim 1, wherein upon selecting the state record, the processing device:

identifies unparameterized data fields in the selected state record; and parameterizes one or more of the unparameterized data fields based on search terms in the second search query.

8. A computer-implemented method comprising:

storing, at a storage device of a search server, a query log that stores search queries that the search server receives, wherein each search query is stored in association with (i) a device identifier (ID) that identifies a mobile computing device that sent the search query and (ii) a time at which the search server received the search query, wherein each search query in the query log is associated with a session ID that indicates a session assigned to the mobile computing device when the mobile computing device transmitted the search query;

storing, at the storage device, an application data store that stores application records, wherein each application record stores information regarding an application;

storing, at the storage device, a state data store that stores state records, wherein each state record stores information regarding an application state;

receiving, via a network communication device of the search server, a search request from a mobile computing device, the search request comprising (i) a device ID that identifies the mobile computing device and (ii) a first search query that comprises one or more search terms;

determining, at a computing processor of the search server, a first time at which the search server received the search request with the first search query;

determining, by the computing processor, a second search query that the search server previously received from the mobile computing device at a second time, wherein the determining the second search query comprises:
   determining a first session ID associated with the mobile computing device when the mobile computing device transmitted the first search query; and
   querying the query log with the device ID and the first session ID;
determining, at the computing processor, that a time difference between the first time and the second time is less than a threshold time period;
selecting, by the computing processor, an application record from the application data store based on the search terms of the first search query;
selecting, by the computing processor, a state record that corresponds to an application state of the application associated with the selected application record based on search terms of the second search query;
generating, at the computing processor, a search result object that comprises information from the application record selected based on the first search query, and the state record selected based on the second search query, wherein the generating the search result object is based on the determined time difference; and
transmitting, via the network communication device, the search result object to the mobile computing device.

9. The computer-implemented method of claim 8, wherein determining the second search query comprises:
   retrieving the device ID from the search request;
   querying the query log with the device ID, and a time range that extends for the threshold time period prior to the first time; and
   receiving the second search query from the query log, the second search query being received at the search server within the time range.

10. The computer-implemented method of claim 8, wherein each search query in the query log is associated with a device location that indicates the location of the mobile computing device when the mobile computing device transmitted the search query; and wherein determining the second search query comprises:
   determining a first location of the mobile computing device when the mobile computing device transmitted the first search query;
   querying the query log with the device ID and the first location; and
   receiving the second search query from the query log, the second search query being associated with a second location that is within a threshold distance of the first location.

11. The computer-implemented method of claim 8, wherein determining the second search query comprises:
   receiving the second search query from the query log, the second search query being associated with a second session ID that is equal to the first session ID.

12. The computer-implemented method of claim 8, wherein selecting the application record comprises:
   querying a mapping mechanism of the application data store with the search terms of the first search query, wherein the mapping mechanism maps keywords to application record IDs that identify the application records; and
   receiving one or more application record IDs from the application data store in response to the querying.

13. The computer-implemented method of claim 8, wherein selecting the state record comprises:
   querying a mapping mechanism of the state data store with the search terms of the second search query, wherein the mapping mechanism maps keywords to state record IDs that identify the state records; and
   receiving one or more state record IDs from the state data store in response to the querying.

14. The computer-implemented method of claim 8, further comprising:
   identifying unparameterized data fields in the selected state record; and
   parameterizing one or more of the unparameterized data fields based on search terms in the second search query.

15. A computer program product encoded on a non-transitory computer readable storage medium comprising instructions that when executed by a computing processor of a search server cause the computing processor to perform operations comprising:
   storing, at a storage device of the search server, a query log that stores search queries that the search server receives, wherein each search query is stored in association with (i) a device identifier (ID) that identifies a mobile computing device that sent the search query and (ii) a time at which the search server received the search query, wherein each search query in the query log is associated with a session ID that indicates a session assigned to the mobile computing device when the mobile computing device transmitted the search query;
   storing, at the storage device, an application data store that stores application records, wherein each application record stores information regarding an application;
   storing, at the storage device, a state data store that stores state records, each state record stores information regarding an application state;
   receiving, via a network communication device of the search server, a search request from a mobile computing device, the search request comprising (i) a device ID that identifies the mobile computing device and (ii) a first search query that comprises one or more search terms;
   determining, at the computing processor, a first time at which the search server received the search request with the first search query;
   determining, by the computing processor, a second search query that the search server previously received from the mobile computing device at a second time, wherein the determining the second search query comprises
     determining a first session ID associated with the mobile computing device when the mobile computing device transmitted the first search query; and
     querying the query log with the device ID and the first session ID;
   determining, at the computing processor, that a time difference between the first time and the second time is less than a threshold time period;
   selecting, by the computing processor, an application record from the application data store based on the search terms of the first search query;
   selecting, by the computing processor, a state record that corresponds to an application state of the application associated with the selected application record based on search terms of the second search query;
   generating, at the computing processor, a search result object that comprises information from the application record selected based on the first search query, and the state record selected based on the second search query, wherein the generating the search result object is based on the determined time difference; and transmitting, via the network communication device, the search result object to the mobile computing device.

16. The computer program product of claim 15, wherein determining the second search query comprises:
retrieving the device ID from the search request;
querying the query log with the device ID, and a time range that extends for the threshold time period prior to the first time; and
receiving the second search query from the query log, the second search query being received at the search server within the time range.

17. The computer program product of claim 15, wherein each search query in the query log is associated with a device location that indicates the location of the mobile computing device when the mobile computing device transmitted the search query; and wherein determining the second search query comprises:
determining a first location of the mobile computing device when the mobile computing device transmitted the first search query;
querying the query log with the device ID and the first location; and
receiving the second search query from the query log, the second search query being associated with a second location that is within a threshold distance of the first location.

18. The computer program product of claim 15, wherein determining the second search query comprises:
receiving the second search query from the query log, the second search query being associated with a second session ID that is equal to the first session ID.

19. The computer program product of claim 15, wherein selecting the application record comprises:
querying a mapping mechanism of the application data store with the search terms of the first search query, wherein the mapping mechanism maps keywords to application record IDs that identify the application records; and
receiving one or more application record IDs from the application data store in response to the querying.

20. The computer program product of claim 15, wherein selecting the state record comprises:
querying a mapping mechanism of the state data store with the search terms of the second search query, wherein the mapping mechanism maps keywords to state record IDs that identify the state records; and
receiving one or more state record IDs from the state data store in response to the querying.

* * * * *